W. H. CAMP.
METHOD OF BALING FIBROUS MATERIALS.
APPLICATION FILED SEPT. 10, 1919.
1,413,456.
Patented Apr. 18, 1922.
7 SHEETS—SHEET 3.
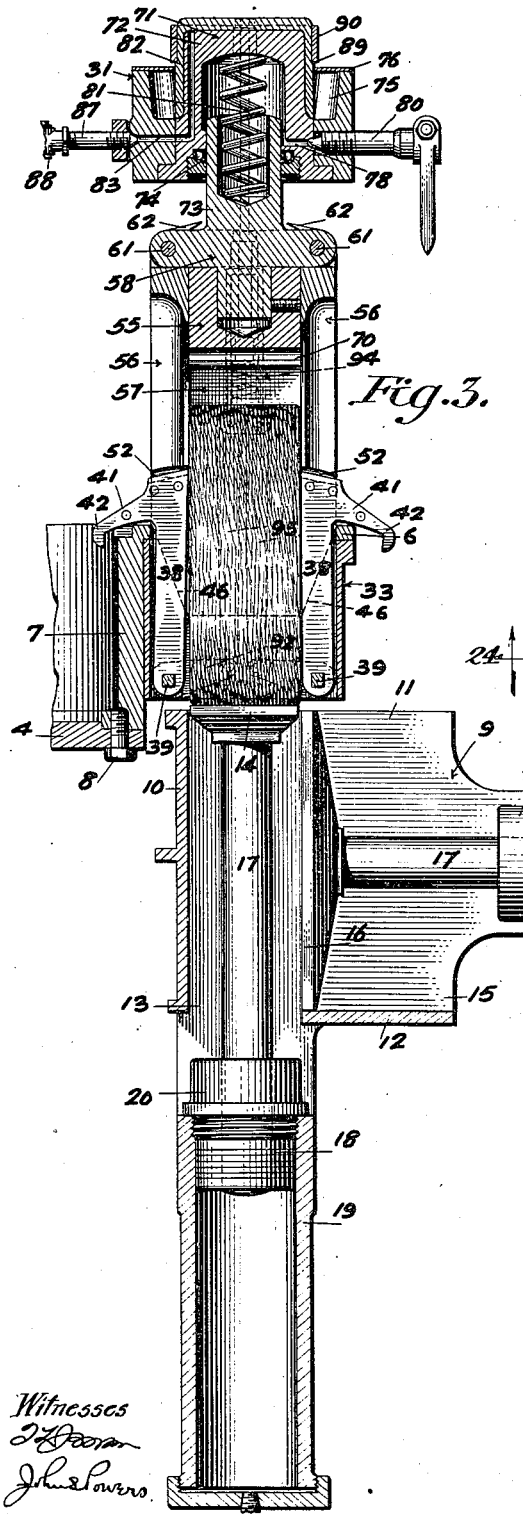
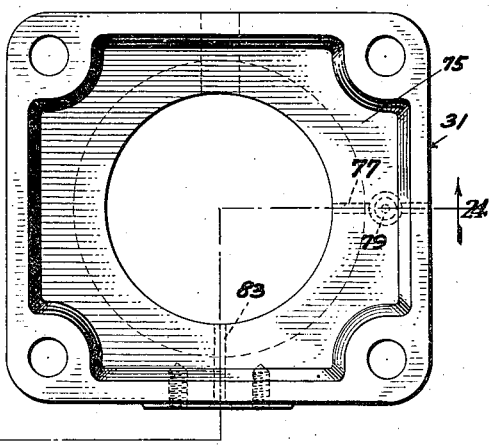
Fig. 23.
Fig. 24.
Inventor:
Warner H. Camp,
by James L. Norris, Attorney.

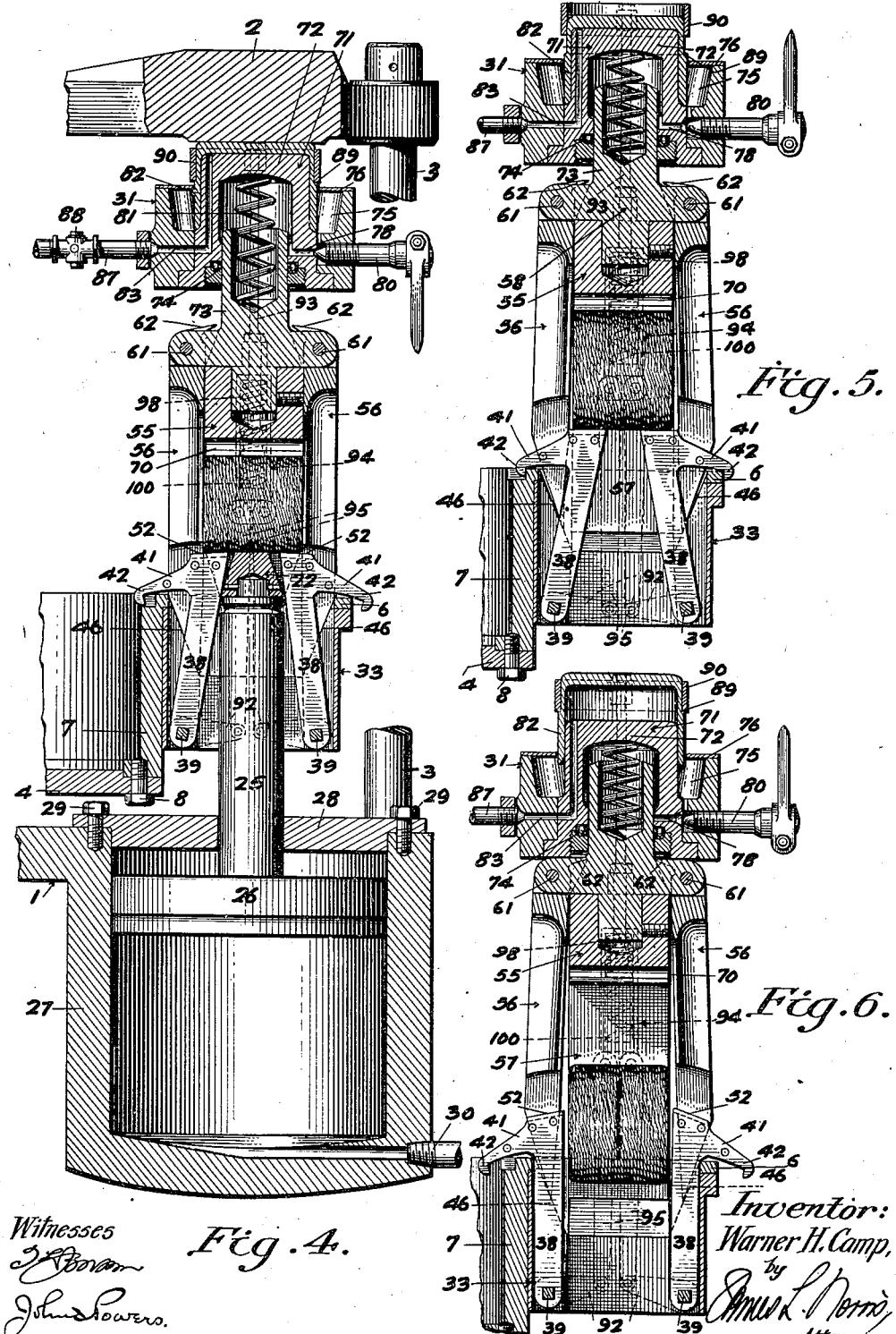

W. H. CAMP.
METHOD OF BALING FIBROUS MATERIALS.
APPLICATION FILED SEPT. 10, 1919.
1,413,456.
Patented Apr. 18, 1922.
7 SHEETS—SHEET 5.
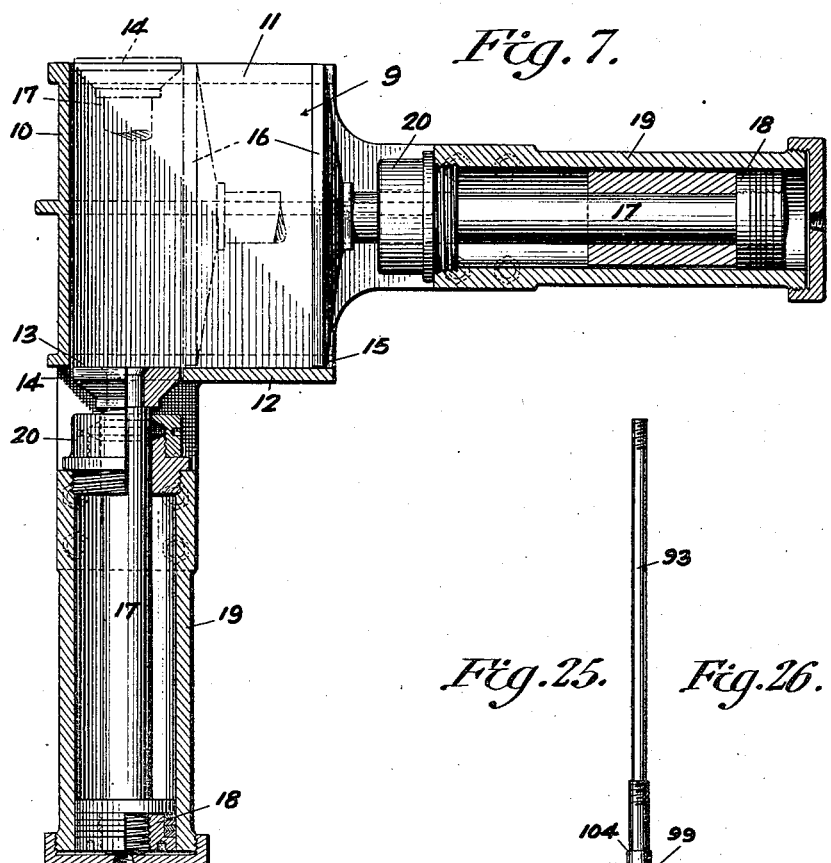
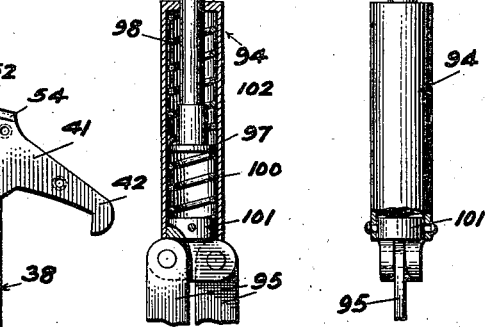
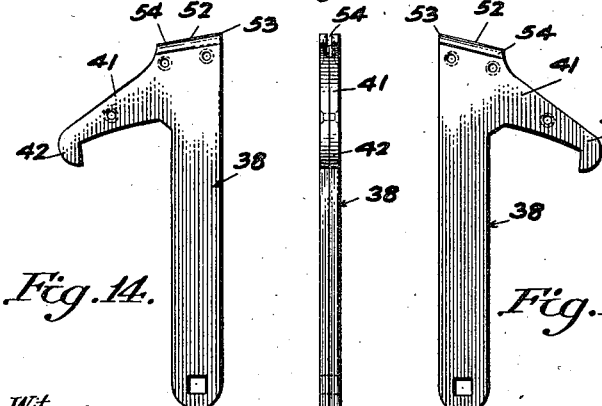
Inventor:
Warner H. Camp,
by
*James L. Norris*, Attorney

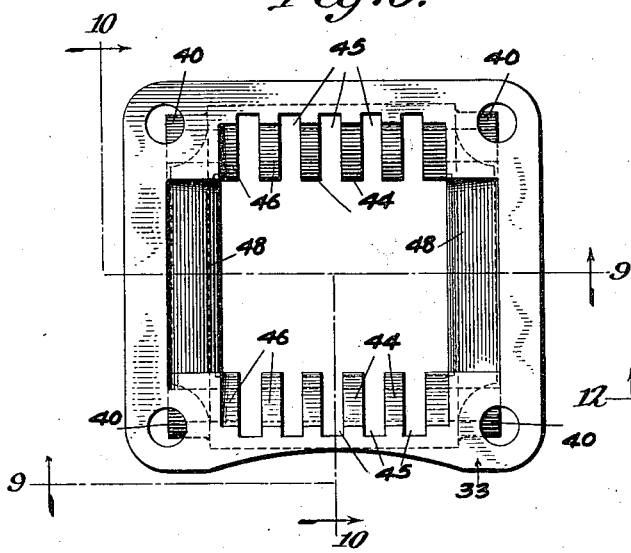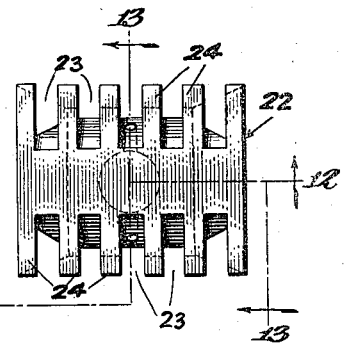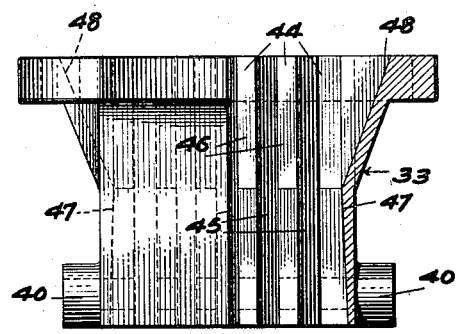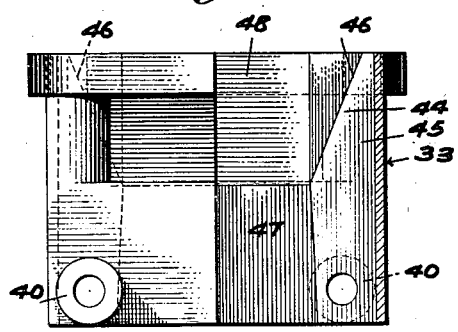

W. H. CAMP.
METHOD OF BALING FIBROUS MATERIALS.
APPLICATION FILED SEPT. 10, 1919.
1,413,456. Patented Apr. 18, 1922.
7 SHEETS—SHEET 7.
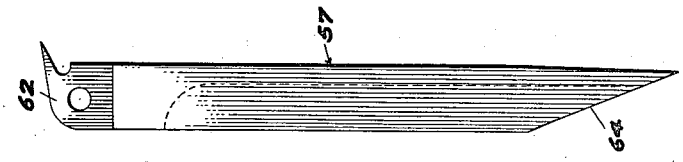
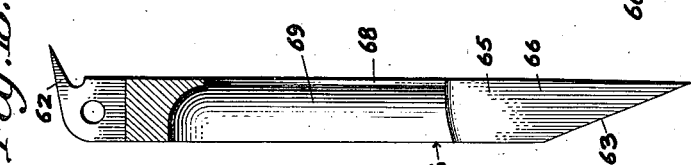
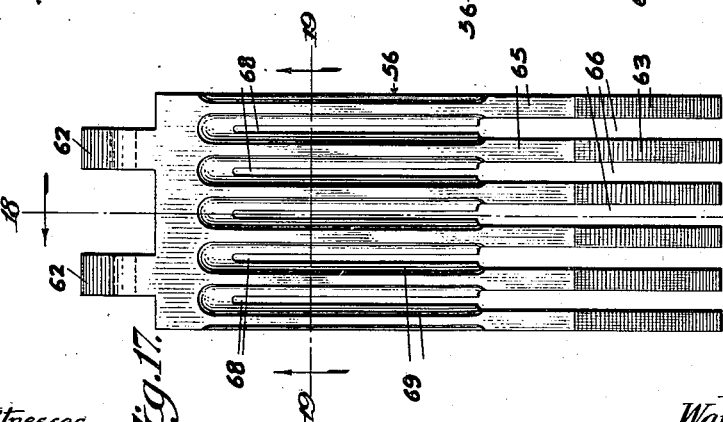
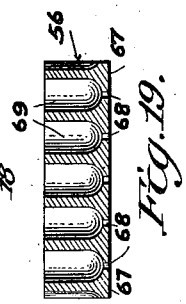
Inventor:
Warner H. Camp,
by
Attorney.

UNITED STATES PATENT OFFICE.

WARNER H. CAMP, OF ATLANTA, GEORGIA, ASSIGNOR, BY MESNE ASSIGNMENTS, TO J. HALL MILLER, OF ATLANTA, GEORGIA.

METHOD OF BALING FIBROUS MATERIALS.

1,413,456.

Specification of Letters Patent. Patented Apr. 18, 1922.

Application filed September 10, 1919. Serial No. 322,919.

*To all whom it may concern:*

Be it known that I, WARNER H. CAMP, a citizen of the United States, residing at Atlanta, in the county of Fulton and State of Georgia, have invented new and useful Improvements in Methods of Baling Fibrous Materials, of which the following is a specification.

This invention relates to an improved method of baling fibrous materials such as require, or are susceptible to, compression to high density, for example, hay.

The principal objects of the invention are to facilitate the high density compression of such materials, to economize space in connection with the achievement of high density compression effects, to expedite the production of finished bales and to produce bales of superior quality in respect to the security and certainty with which the bales are tied and by their ties maintained in an advantageous form and under high density compression.

With the above objects in view the features of the method are concerned with the compression of the material and also, with the discharge of the material, as compressed into a bale and tied, from the press. Stated generally: the method, as it is concerned with the compression of the material, consists in effecting the compression of the entire mass of material which is to form the bale, in two successive stages, the first a preliminary compression stage, and the second a final and high density compression stage, in such manner and relation that the material is substantially halved in volume by its preliminary compression, as preliminarily compressed is again substantially halved in volume by its final, high density compression, the preliminary and high density compression thrusts are exercised at a right angle to one another, and the material as preliminarily compressed is directly transferred, the preliminary compression being maintained the while, into position for high density compression; and as it is concerned with the discharge of the material, as compressed into a bale and tied, the method consists in gradually relieving the pressure upon all sides of the bale at a regulated and controllable rate whereby the re-expansion tendency of the densely compressed bale is at all times under complete, positive and definite control, and, when the pressure has been relieved to the necessary extent and with the gradualness desired, in effecting the discharge of the bale from the press.

The practice of the method and an apparatus adapted thereto are shown in the accompanying drawings, in which:—

Figure 3 is a vertical sectional view of mechanism in association with the baling press for preliminarily compressing the bale and loading the press chamber, upon the completion of the operation thereof.

Figure 4 is a vertical sectional view showing the compression of the bale to high density.

Figure 5 is a similar view showing the gradual relief of the finished bale prior to its discharge.

Figure 6 is a similar view showing the discharge of the bale.

Figure 7 is a detail vertical sectional view of the preliminary compression and loading chamber and the plungers co-operating therewith.

Figure 8 is a plan view of the lower portion of the press chamber.

Figure 1:
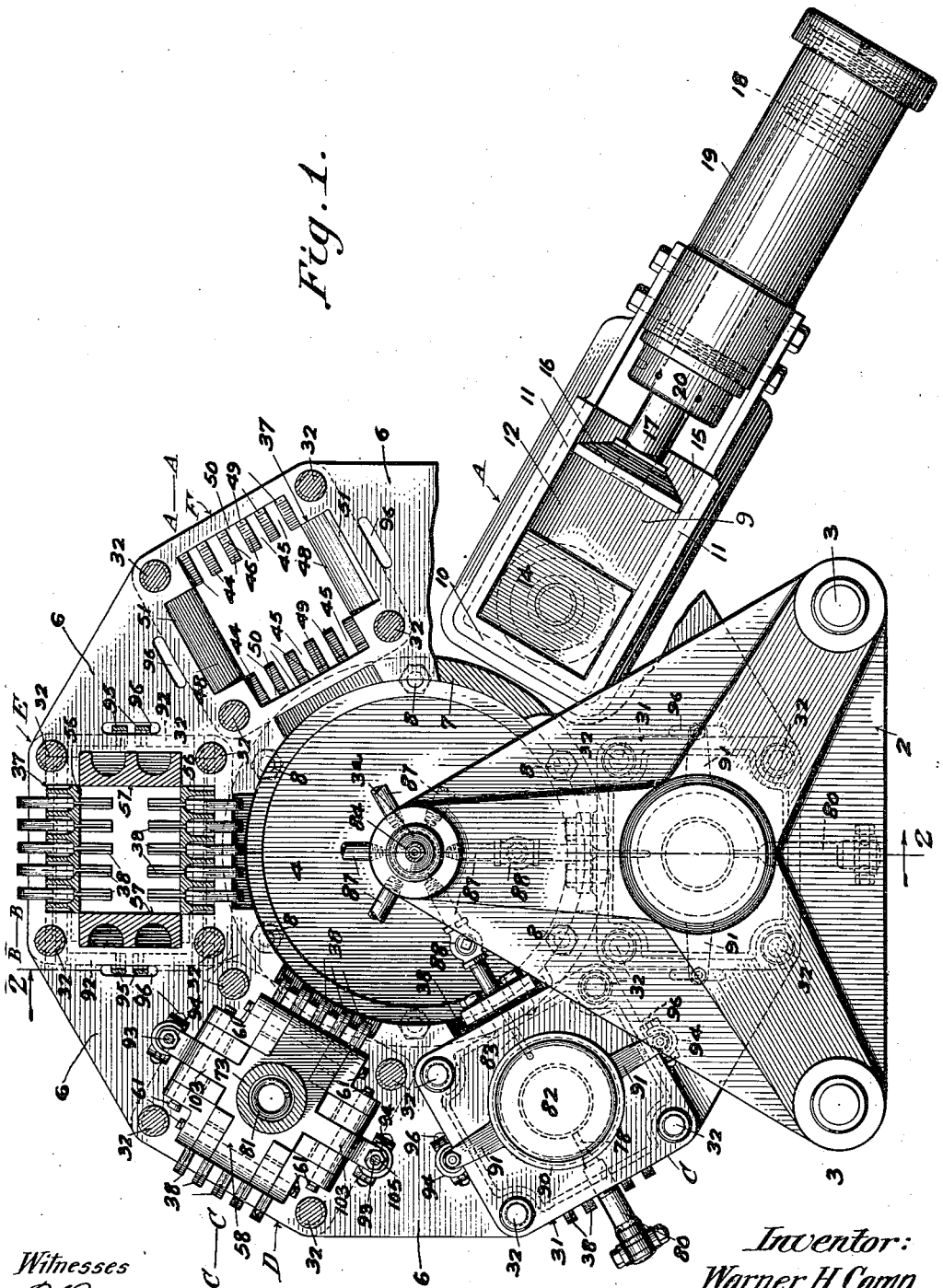
Figure 1 is a plan view, partly in section, of a baling press.

Figures 9 and 10 are partial elevations and vertical sections on the respective lines 9—9 and 10—10 of Figure 8.

Figure 11 is a plan view of the high density baling plunger.

Figures 12 and 13 are partial elevations and vertical sections on the respective lines 12—12 and 13—13 of Figure 11.

Figures 14, 15 and 16 are views, Figures 14 and 16 side elevations, and Figure 15 an edge elevation of one of the dogs of which two groups are employed for holding the bale in the press chamber.

Figure 17 is an elevation showing the outer face of one of the vertical movable walls of the press chamber.

Figures 18 and 19 are vertical and horizontal sectional views on the lines 18—18 and 19—19 of Figure 17.

Figure 20 is an elevation showing the inner face of the wall shown in Figure 17.

Figure 21 is an elevation showing the outer face of another of the vertical movable walls of the press chamber and Figure 22 is a side elevation thereof.

Figure 23 is a plan view of a stationary head which forms an element of each press unit.

Figure 24 is a partial elevation and vertical section on the line 24—24 of Figure 23.

Figure 25 is a vertical sectional view and Figure 26 is an elevation of certain connections between the movable head of the press chamber and the dogs shown in Figures 14–16.

Similar characters of reference designate corresponding parts throughout the several views.

The method may be carried out with the aid of apparatus of various kinds, but the apparatus disclosed, which forms the subject of my pending application, Serial No. 322,918 filed Sept. 10, 1919, is specially adapted and, as now considered, preferred, for the practice of the method.

The main frame (Figures 1 and 2) of the press consists of a base 1 and head 2 connected by vertical tension rods 3 and 3ª, the rod 3ª being utilized as the axis of rotation of the press unit carrier or turret. The turret base 4 has a central bearing sleeve 5 surrounding the rod 3ª and engaging the base 1 as a support. The annular table 6 of said turret is supported from and above the base 4 by a cylindrical flange 7 secured to said base 4 by screws 8.

The table carries a suitable number of counterpart press units, six being preferably employed. In the formation of the bale there are certain sequential operations which are performed concurrently upon the different bales in the respective press units. The turret is rotated in step-by-step fashion to bring each press unit into relation to the successive stations at which the respective sequential operations are performed. These stations, in their order, are preliminary compression and loading stations, a high density baling station, two bale tying stations, a bale relieving station and a bale discharging station. As disclosed and preferred, the press chamber of each unit has an open lower end through which the bale is introduced.

The method is adapted to loose material or to material baled to high density by field presses.

The material is initially deposited in a preliminary compression chamber 9 (Figures 1, 3 and 7) which is open at its top and includes a fixed end wall 10, fixed side walls 11 and a fixed bottom section 12. The bottom, as normally constituted, is completed by a loading plunger 14 occupying a bottom opening 13. The wall 10 is opposed by a preliminary compression plunger 16, constituting a movable end wall, and normally occupying an end opening 15. The chamber 9 is located in part under the table 6 but projects radially therefrom and the material is conveniently introduced into the chamber in such quantity as to completely fill it through the open upper end of the projecting portion, the plungers 14 and 16 being then retracted. The chamber 9 is preferably proportioned to receive two standard size field bales which are set on end, one resting on the plunger 14 and the other on the bottom section 12. The plunger 15 has a stroke equal to one-half of the length of the chamber 9 whereby the material, as preliminary compressed by the full projection of said plunger, is halved in volume, e. g., two field bales will be preliminarily compressed into the compass of a single bale.

The plunger 16 is held fully projected while the plunger 14 moves upward to carry the preliminarily compressed material into the high density press chamber located in alinement with the chamber 9.

The plungers 14 and 16 are shown as operated hydraulically and as mounted upon rods 17 provided with pistons 18 operating in cylinders 19 located at right angles to one another and having suitably packed heads 20 through which the rods 17 work. The valve connections by which the fluid medium is controlled may be of any well known and suitable structure and arrangement and are, therefore, not shown.

The high density compression of the bale immediately succeeds the loading of the press chamber. The active element for high density compression is a plunger 22 (Figure 2) operating vertically through the press chamber and cooperating with certain parts of said chamber to reduce the volume of the bale, as loaded therein, by substantially half. This will be apparent from a comparison of Figures 3 and 5; Figure 3 showing the bale as loaded into the press chamber and Figure 5 showing it upon the completion of the high density compression and in its final size. As completed the bale is substantially one-fourth of the volume of the material as introduced into the chamber 9.

The plunger 22 is preferably operated by compressed air, its rod 25 having a piston 26 operating in a cylinder 27 whose upper end is closed by a head 28 secured by fastenings 29 and whose lower end has a combined compressed air inlet and exhaust duct 30. The cylinder 27 is preferably combined with the base 1. The valved connections by which the compressed air is controlled may be of any suitable and known construction and, therefore, are not illustrated.

The table 6 is utilized as a part of the framing of each press unit, such framing (Figures 1 and 2) additionally including a stationary head 31 and posts 32 extending between and connecting said table and said head.

Each press chamber has an extension box 33 (Figures 2 and 3) supported below the table 6 by the posts 32 and nuts 34 on the lower ends of said posts. The extension 33 is of rectangular form, open at its upper and lower ends, and in registry with an opening 37 in the table 6, the walls of said opening being functionally parts of the walls of said box.

The box 33 maintains the preliminary compression of the bale and the opening delimited by its vertical walls, of course, conforms to the horizontal outline and dimensions of the bale. Preferably, the bale-engaging face of the box 33 are slightly and regularly upwardly tapering in order that the box may exert gradually increasing lateral compressive pressure upon the bale as it is moved through said box by the plunger 22.

Figure 2:
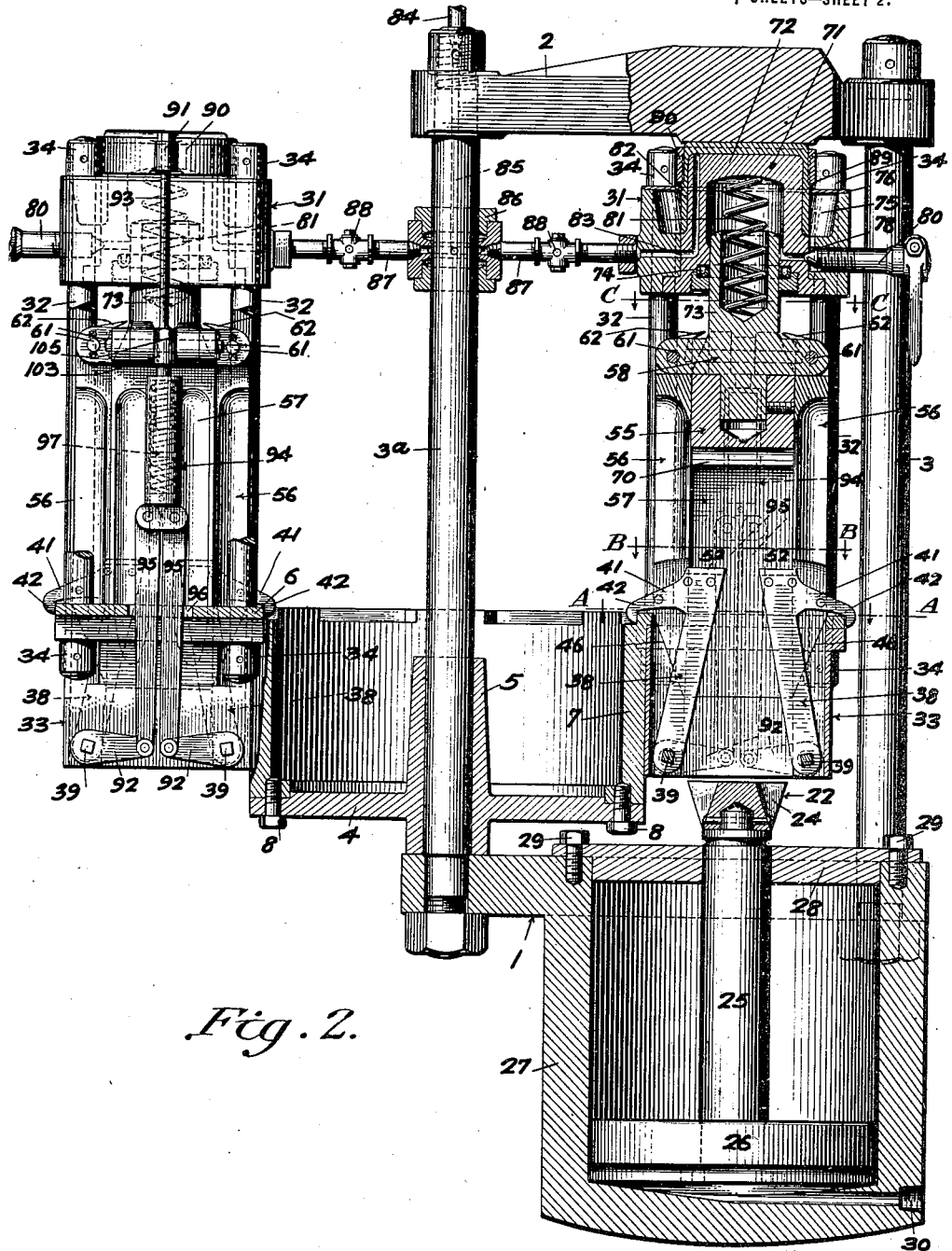
Figure 2 is a vertical sectional view on the line 2—2 of Figure 1. The lines A—A, B—B and C—C of Figure 2 indicate the planes of the respective horizontal sectional views incorporated in Figure 1, reading from the right to the left of said figure.

The structure includes means for the support of the bale which is operable to provide for its discharge from the press. Such means comprises dogs 38 which are arranged in opposing groups adjacent the inner and outer circumference of the turret and are mounted upon parallel rock shafts 39 journaled in bearings 40 near the lower end of the box 33, the dogs projecting upward through said box into the press chamber proper. The dogs have two positions, in one of which they are upright as shown in Figure 3, and in the other and normal of which they are inclined toward one another as shown in Figures 2 and 5. To limit their inward movement the dogs are provided above the table 6 with arms 41 which terminate in hook-like lugs 42 for engagement with the inner and outer circumferential edges of said table.

The bale-engaging surfaces of the box 33 (Figures 8-10) at the sides thereof adjacent which the dogs 38 are mounted, are, in part, afforded by inwardly projecting vertical ribs 44 which delimit vertical recesses 45 in which the dogs are arranged and have their movement. The dogs are pressed back into their upright or outer positions by the adjacent upper edges of the bale very shortly after the bale penetrates the box 33 in connection with the loading of the press chambers; when the dogs are upright their confronting faces are parts of the bale-engaging surfaces of the box and are flush with the respective confronting faces of the ribs 44. The bale-engaging surfaces of the box are completed by the lower portions of the walls of the press chamber proper, as will be hereafter described. To accommodate the press chamber walls the upper portions of the ribs 44 are outwardly inclined, as at 46, and the upper portions of the other two walls 47 are outwardly inclined as at 48. The walls of the opening 37 adjacent the inner and outer circumference of the turret are formed with projections 49 and recesses 50 alining with the respective ribs 44 and recesses 45; and the faces of the projections 49 are inclined conformably to the inclination 46 of the faces of the ribs. The other two walls of the opening 37 have their confronting faces 51 inclined conformably to the inclination 48 of the walls 47 of the box 33.

The plunger 22 (Figures 2, 4 and 11-13) is formed with projections 24 alining with the ribs 44 and with recesses 23 alining with the recesses 45 and affording accommodation for the dogs 38, enabling them to move inward and under the bale, as shown in Figure 4, when the plunger has reached the limit of its upward stroke.

The upper faces 52 (Figures 2 and 14-16) of the dogs 38 are arranged to occupy a common horizontal plane when the dogs are in their inner positions, thereby to provide uniform and stable support for the bale. The faces 52 terminate in engaging points 53 which, by virtue of the normal tendency of the dogs to move inward, bite into and, therefore, securely grip the bale and hold it against downward displacement during the interval between the loading of the press chamber and the high density compression of the bale.

The press chamber proper (Figure 2) consists of a top wall or platen 55, two opposing vertical walls 56, and two opposing vertical walls 57 at right angles to the walls 56. Said platen and vertical walls co-operate with the plunger 22, in the high density compression of the bale and are carried by a vertically movable head 58, the platen being rigidly secured against the under face of the head and the vertical walls being connected to the head by knuckle pivots 61, from which they depend. When the head moves upward the platen moves away from the upper end of the bale and the vertical walls move outward, thereby to relieve the pressure upon all sides of the bale. The walls 56—57 may be provided at their upper ends with inwardly directed fingers 62 which work in the recesses between the pivot knuckles of the head 58 and, as said head reaches the upward limit of its movement, engage the press unit head 31, thereby to insure positive movements of the walls 56—57 to their extreme positions.

The outer faces of the walls 56—57 (Figures 18 and 22) have their lower portions formed on downward and inward inclinations 63 and 64 respectively, conforming to the inclinations 46 and 48 of the extension box 33. The lower portions of said walls project into the box 33 (Figure 2) and, by virtue of the inclinations 46—63 and 48—64, have their inner faces flush with the bale-engaging faces of said box.

The walls 56 adjoin the inner and outer circumferences of the turret and have a grid-like form (Figures 17 and 20), including a plurality of vertical parallel members whose lower portions 65 conformably aline with the ribs 44 and delimit recesses 66 which aline with the recesses 45 and accommodate the portions of the dogs 38 which project upward beyond the box 33.

The dogs 38 are formed in their upper faces 52 with slots 54, preferably of key-hole cross-section, and the platen 55 has its working face formed with similar slots 70, the slots 54 and 70 serving as guides for the tie wires. Above the portions 65, the walls 56 are formed with wider portions 67 which delimit relatively narrow slits 68, these being preferably bell-mouthed, as at 69, along the outer faces of said walls, and serving as guides for the tie wires.

After the bale has been compressed to high density by the co-operative action of the plunger 22, platen 55 and walls 56—57, as shown in Figure 4, the plunger is retracted, but the support and high density compression of the bale is continued by the dogs 38 throughout the tying operations which are performed at the two stations succeeding the high density compression station. The bale is tied by operatives with wire strands in the usual or any suitable manner, the strands, of which any desired number may be employed, being threaded or manipulated through the slots 54 and 70 and the slits 68 and tightened about the bale, their ends being then suitably secured together.

Upon the release of the compression pressure exercised by the press chamber parts, the bale tends to re-expand, but this tendency is largely counteracted by the tie wires. However, if the re-expansion tendency develop suddenly or violently, there is serious liability of the tie wires being snapped or stretched beyond the elastic limit. According to the present method, this effect is prevented by very gradually relieving the pressure upon all sides of the bale at a regulated, and controllable, rate prior to the discharge of the bale from the press, this "relieving" operation being performed at a station intermediate the last tying station and the final station of the machine whereat the bale is discharged.

During the high density compression operation (Figure 4) the head 58 is held with substantial rigidity in its lowermost position and thereby the platen 55 and walls 56—57 are rigidly maintained in their operative positions. But for the gradual relief of the compression pressure (Figure 5) the head and platen are permitted to rise under the re-expansion tendency of the bale and as the head thus moves upward it raises the walls 56 and 57 and the re-expansion of the bale at its sides moves the said walls outward, it being understood that the raising of the walls 56—57 provides for a measure of outward swinging movement of said walls which is limited by the engagement of their lower ends with the walls of the extension box 33.

For the control of the head 58 it is preferred to employ an oil chamber and piston in association with said head and the stationary press unit head 31. The press unit head has incorporated therewith a cylinder 71 (Figure 2) whose upper end is closed by a head 72 and whose lower end is open. The cylinder 71 provides an oil chamber and the head 58 carries an upright plunger 73 which projects into said cylinder, the joint being maintained oil tight by suitable packing 74. The head 31 is formed externally of the cylinder with an oil reservoir 75 closed by a suitably secured plate 76; and the cylinder 71 communicates (Figures 2, 23 and 24) with said reservoir by inlet and outlet ducts 77 and 78. The duct 77 is controlled by a suitable check valve 79 whereby the oil may not be forced back from the cylinder 71 to the reservoir 75, but may freely pass from said reservoir to said cylinder; and the duct 78 is controlled by a suitable manually operated valve 80 (preferably of the screw stem type) which may be opened by any desired degree to regulate the flow of oil from the cylinder 71 to the reservoir 75.

During the high density compression operation the valve 80 is fully closed and the oil is confined in the cylinder 71, its escape being prevented by the check valve 79. The oil in the cylinder 71 functions as a rigid abutment for the plunger 73, whereby the head 58 is rigidly held in its lowermost position and the platen 55 and walls 56—57 are rigidly maintained in their operative positions. It will be obvious that the opening of the valve 80 provides for the escape of oil from the cylinder 71 to the reservoir 75 and that the plunger 73 in response to the upward pressure exercised by the densely compressed bale on the platen 55 will, when the valve 80 is opened, move into the cylinder 71 and force the oil from said cylinder through the duct 78 into the reservoir 75. Consequently when the compression pressure is to be relieved, the valve 80 is manipulated and, by opening said valve to a greater or less degree, (Figure 5) the gradual relief of the compression pressure may be absolutely controlled and regulated, i. e., accelerated or retarded as desired.

An expansive helical spring 81 is preferably arranged between the plunger 73 and the cylinder head 72 to assist the return of the head 58 to its normal position.

After the compression pressure has been relieved the oil escape valve 80 is left open and the press unit is moved to the bale discharging station where the dogs 38 are operated to release the bale and permit its discharge by gravity (Figure 6), the released bale dropping from the press through the lower end of the box 33. The mechanism by which the dogs 38 are controlled and operated is preferably correlated to the press chamber head 58 in such manner that it will effect a further upward movement of said head, will act in conjunction with the oil in the cylinder 71 in retarding the upward movement of the head, and the consequent outward movement of the walls 56—57 during the bale relieving operation above described, and will prevent an operation of the dogs to release the bale, except when the pressure on the bale has been relieved.

The mechanism for operating the dogs 38 to release the bale is preferably operated by compressed air and has, as its operating part, an air driven cylindrical cap 82 (Figures 2, 5 and 6) which has a close sliding fit on the cylinder 71. The press unit head 31 has an air duct 83 which opens to the upper face of the cylinder head 72, and the air admitted through the duct 83 reacts against the head 72 and raises the cap 82.

The air reservoir (not shown) is connected (Figures 1 and 2) by a pipe 84 to a duct 85 formed axially in the upper portion of the tension rod 3ᵃ and communicating at its lower end with a distributing chamber 86 fitted with air tight jointure upon the rod 3ᵃ and connected by radial pipes 87 to the ducts 83 of the respective press units. The pipes 87 are provided with manually operated controlling valves 88 of suitable and well known structure which may be operated to pass air to the ducts 83 for the operation of the cap 82 and to vent the air to the atmosphere after the cap has been operated, thereby to provide for the return of the cap to its normal position wherein it rests upon the head 31.

The cap 82 has an external annular shoulder 89 which affords seating for a ring 90 slidable on said cap and provided with opposite radial arms 91. The shafts 39 which carry the dogs 38 are provided at their ends with crank arms 92 which are resiliently or elastically connected to the arms 91 of the ring 90, the connections (Figures 2, 25 and 26) comprising a stem 93 rigidly secured to and pendent from each arm 91, a sleeve 94 enclosing the lower end of said stem and slidable thereon, and toggle links 95 between the sleeve 94 and the crank arms 92 at the same side of the press unit, the table 6 (Figure 1) having slots 96 through which the links 95 project. The stem 93 has at its lower end a head 97 which affords bearings for two expansive helical springs, the upper one 98 bearing against the flange 99 at the upper end of the sleeve 94, and the lower one 100 bearing against the bottom head 101 of said sleeve. Above the head 97 the stem is formed with an annular shoulder 102 which, at times, engages the flange 99 as will be hereafter described.

The head 58 is provided with arms 103 to which the stems 93 are fitted by means of shoulders 104, and clamping nuts 105 on said stems bearing against the lower and upper faces of said arms. Normally, the arms 103 are suitably spaced above the sleeves 94 whereby said sleeves may have upward play on the stems 93.

The dogs 38 tend to move into their inner and normal positions by gravity, but they are also urged into such positions by the springs 100. Thus when, in the loading of the press chamber, the bale presses the dogs outward, such outward movement is resisted by the springs 100 which, when the bale has passed upward beyond the dogs, snap them into their inner position to provide support for the bale, as shown in Figure 5.

During the relief of the compression pressure on the bale, the stems 93 move upward with the head 58 and compress the springs 98, the sleeves 94 being held stationary by the dogs 38, whose movement is prevented by the weight of the bale resting thereon. The springs 98 thus provide further or cumulative means for insuring of the gradual relief of the pressure on the bale.

The ring 90 slides upward (Figure 5) on the cap 82 during the relief of the compression pressure, but during the release of the bale it is engaged and raised (Figure 6) by the cap. For this operation, the valve 88 is manipulated to admit compressed air under the cap which engages the ring 90 shortly after its upward movement commences. When the ring 90 is raised by the cap the stems 93, participating in its upward movement, lift the sleeves 94, and, through the links 95 and crank arms 92, move the dogs 38 outward from under the bale. In lifting the sleeve 94, the stems at first act through the spring 98 which function as resilient cushions. Subsequently the shoulders 102 of said stems engage the flanges 99 of the said sleeves and thereupon the sleeves are lifted positively. The stems 93, as thus raised by the cap 82, lift the head 58, the oil escape valve 80 having been left open as previously explained. This further upward movement of the head 58 obviously increases the amplitude of outward movement of the press chamber walls 56—57.

The engagement of the press chamber head 58 against the press unit head 31 limits the upward movement of the cap 82 and by means of the fingers 62, effects the positive and full spacing of the walls 56—57 from the bale. At the same time the dogs 38 will be fully and positively withdrawn from under the bale, the latter thereupon dropping through the press chamber and its extension box 33, as shown in Figure 6.

Upon the discharge of the bale, the parts are reset by venting the compressed air from the cap 82 by appropriate manipulation of the valve 88, and then closing the oil escape valve 80. Thereupon the head 58 returns by gravity, aided by the spring 81, to its normal position and in its downward movement draws the oil charge from the reservoir 75 into the cylinder 71, the escape of the oil from said cylinder being prevented by the check valve 79. The head 58, moving downward, carries with it the stems 93 which, through the ring 90, positively effect the return of the cap. The sleeves 94 of course, follow the stems 93 and the dogs 38 resume their normal position by gravity. The press chamber is then ready to receive another preliminarily compressed bale and for such purpose is moved to the loading station whence it started.

The connection of the stems 93 to the head 58, aside from providing for the operation of said head by the cap 82 and the return of the parts to their normal positions consequent to the downward movement of said head, also insures that the dogs 38 may not be operated to release the bale until after the valve 80 has been operated to permit the upward movement of the head 58, thereby making it compulsory to gradually relieve the compression pressure on the bale prior to its discharge from the press. This is for the reason, as will be obvious, that the head 58 is held rigidly in its normal position so long as the valve 80 is closed and, as thus held rigid, will prevent an upward movement of the cap 82, the stems 93 functioning as ties; wherefore the cap 82 may be operated only as the head 58 is permitted to rise by the operation of its controlling means, specifically the valve 80.

The six stations are shown in Figure 1 as follows: A, preliminary compression and loading; B, high density compression; C, D, tying; E, relief of compression pressure; and F, bale discharging. The turret may be rotated in any suitable manner, each step of rotation bringing a press unit to one of the stations and each revolution of the turret bringing a press unit to all of the stations. Hence when the turret is at rest, its six press units are located at the respective stations and the sequential operations necessary for each bale are concurrently performed. At station A, the bale is preliminarily compressed by the plunger 16, and, as thus compressed, loaded into the press chamber of the adjacent unit by the plunger 14; during its movement from station A to B the bale is supported by the dogs 38 whose points 53 bite into or grip its opposite sides; at B the bale is densely compressed within the press chamber of the adjacent unit by the plunger 22 in co-operation with the platen 55 and press chamber walls 56—57; at station C—D the high density compression is maintained by the dogs 38 in co-operation with the platen 55 and walls 56—57 and the bale is tied by operatives, the wires being threaded through the slots 54 and 70 of the plunger 22 and platen 55 and through the slits 68 of the press chamber walls 56; at station E, the compression pressure on the bale is gradually relieved, at a regulated rate, by permitting the escape of the oil abutment by which the head 58 is normally backed whereby the platen 55 moves upward and the walls 56—57, as elevated by the head 58, swing outward, all in response to the re-expansion tendency of the bale; and at station F, the dogs 38 are withdrawn from under the bale by the upward movement of the cap 82 consequent to compressed air being delivered under said cap, at which time the bale drops from the press through the open extension box 33 and after the bale has thus been discharged, the parts are reset by the downward movement of the head 58, such downward movement being permitted by the venting of the compressed air from within the cap.

Having fully described my invention, I claim:—

1. A method of baling fibrous material which consists in preliminarily compressing a charge of such material, moving the preliminarily compressed material in a direction substantially at right angles to the direction of preliminary compression to a position wholly beyond the position of the preliminary-compression and maintaining the material under such compression, transferring the preliminarily compressed material to a predetermined position, and then densely compressing the preliminarily compressed charge into bale form in a direction at right angles to the direction of preliminary compression.

2. A method of baling fibrous material which consists in preliminarily compressing a charge of such material, thereby effecting a substantial reduction of its volume, moving the preliminarily compressed material in a direction at a right angle to the direction of preliminary compression to a position wholly beyond the position of preliminary compression and maintaining the preliminary compression pressure during such movement, and then densely compressing the preliminarily compressed charge into bale form in a direction at a right angle to the direction of preliminary compression, thereby effecting a further substantial reduction of the volume of the material.

3. A method of baling fibrous material which consists in preliminarily compressing a charge of such material, thereby effecting a substantial reduction of its volume, moving the preliminarily compressed material to a position wholly beyond the position of preliminary compression and maintaining the preliminary compression during such movement, and then densely compressing the preliminarily compressed charge into bale form in a direction the same as the direction of its movement, thereby effecting a further substantial reduction of the volume of the material.

4. A method of baling fibrous material which consists in preliminarily compressing a charge of such material, thereby effecting a substantial reduction of its volume, then densely compressing the preliminarily compressed charge into a bale in a direction at a right angle to the direction of preliminary compression, tying the bale while maintaining the high density compression thereof, and gradually relieving the pressure upon the bale, as densely compressed and tied, thereby substantially to impede and retard its re-expansion.

5. A method of baling fibrous material which consists in preliminarily compressing a charge of such material, thereby effecting a substantial reduction of its volume, then densely compressing the preliminarily compressed charge into a bale in a direction at a right angle to the direction of preliminary compression, tying the bale while maintaining the high density compression thereof, and gradually relieving the pressure upon the bale, as densely compressed and tied, and continuously regulating the rate of gradual relief, thereby substantially to retard, and positively and certainly to control, the re-expansion of the bale.

6. A method of baling fibrous material which consists in preliminarily compressing a charge of such material, thereby effecting a substantial reduction of its volume, moving the preliminarily compressed charge in a vertical direction at a right angle to the direction of preliminary compression to a position wholly beyond the position of preliminary compression and maintaining the preliminary compression during such movement, then densely compressing the preliminarily compressed charge into a bale in a direction the same as the direction of its movement, thereby effecting a further substantial reduction of the volume of the material, providing subjacent support for the bale to maintain the high density compression thereof and tying the bale while the high density compression is thus maintained, gradually relieving the pressure upon the bale, as densely compressed and tied, thereby substantially to impede and retard its re-expansion, and withdrawing the subjacent support of the bale when the high density compression thereon has been sufficiently reduced in consequence of its gradual relief.

7. A method of baling fibrous material which consists in densely compressing a charge of such material into a bale, tying the bale while maintaining the high density compression thereof, and gradually relieving the pressure upon the bale, as densely compressed and tied, thereby substantially to impede and retard its re-expansion.

8. A method of baling fibrous material which consists in densely compressing a charge of such material into a bale, tying the bale while maintaining the high density compression thereof, and gradually relieving the pressure upon the bale, as densely compressed and tied, and continuously regulating the rate of gradual relief, thereby substantially to retard, and positively and certainly to control, the re-expansion of the bale.

9. A method of baling fibrous material which consists in densely compressing a charge of such material into a bale, providing subjacent support for the bale to maintain the high density compression thereof and tying the bale while the high density compression is thus maintained, gradually relieving the pressure upon the bale, as densely compressed and tied, thereby substantially to impede and retard its re-expansion, and withdrawing the subjacent support of the bale when the high density pressure thereon has been sufficiently reduced in consequence of its gradual relief.

10. A method of baling fibrous material which consists in preliminarily compressing a charge of such material, thereby effecting a substantial reduction of its volume, directly moving the preliminarily compressed charge into a supporting medium and maintaining the preliminary compression pressure during such movement and also within the supporting medium, then moving the supporting medium to a determined position, and then densely compressing the preliminarily compressed charge in the supporting medium into bale form in a direction at a right angle to the direction of preliminary compression, thereby effecting a further substantial reduction of the volume of the material.

11. A method of baling fibrous material which consists in preliminarily compressing a charge of such material, thereby effecting a substantial reduction of its volume, directly moving the preliminarily compressed charge into a supporting medium and maintaining the preliminary compression pressure during such movement and also within the supporting medium, then moving the supporting medium to a determined position, then densely compressing the preliminarily compressed charge in the supporting medium into a bale in a direction at a right angle to the direction of its preliminary compression, thereby effecting a further substantial reduction of the volume of the material, tying the bale while densely compressed, gradually relieving the pressure upon the bale, as densely compressed and tied, thereby substantially to impede and retard its re-expansion, and then with the relief of the pressure continued, moving the supporting medium to another determined position and in such position discharging the bale.

12. A method of baling fibrous material which consists in densely compressing a charge of such material into a bale in a supporting medium, tying the bale while densely compressed, gradually relieving the pressure upon the bale, as densely compressed and tied, thereby substantially to impede and retard its re-expansion, and then, with the relief of the pressure continued, moving the supporting medium to a determined position and in such position discharging the bale.

In testimony whereof I have hereunto set my hand in presence of two subscribing witnesses.

WARNER H. CAMP.

Witnesses:
LEE ROY CAMP,
JOHN S. POWERS.